United States Patent
Fleming et al.

(10) Patent No.: US 8,694,217 B2
(45) Date of Patent: Apr. 8, 2014

(54) METHOD AND SYSTEM FOR ADJUSTING A GEAR MAP

(75) Inventors: Matthew Eugene Fleming, Santa Ana, CA (US); Avernethy Francisco, Torrance, CA (US); Christopher Bartlett Gregg, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 279 days.

(21) Appl. No.: 12/898,486

(22) Filed: Oct. 5, 2010

(65) Prior Publication Data
US 2012/0083976 A1  Apr. 5, 2012

(51) Int. Cl.
*G06F 19/00*   (2011.01)

(52) U.S. Cl.
USPC .......................................................... 701/55

(58) Field of Classification Search
None
See application file for complete search history.

(56) References Cited

U.S. PATENT DOCUMENTS

| | | | |
|---|---|---|---|
| 5,555,502 A | 9/1996 | Opel | |
| 5,842,950 A * | 12/1998 | Tsutsui et al. | 477/143 |
| 6,019,701 A | 2/2000 | Mori et al. | |
| 6,086,506 A | 7/2000 | Petersmann et al. | |
| 6,193,333 B1 | 2/2001 | Guest | |
| 6,244,986 B1 | 6/2001 | Mori et al. | |
| 6,283,240 B1 | 9/2001 | Beever | |
| 6,514,174 B2 | 2/2003 | Iida et al. | |
| 6,641,502 B2 | 11/2003 | Heim | |
| 6,671,602 B1 | 12/2003 | Speicher et al. | |
| 7,097,587 B2 | 8/2006 | Kanafani et al. | |
| 7,374,510 B2 | 5/2008 | Unno et al. | |
| 2007/0232440 A1 | 10/2007 | Han | |
| 2008/0077297 A1 * | 3/2008 | Ito et al. | 701/48 |
| 2008/0090690 A1 * | 4/2008 | Lee | 475/207 |
| 2008/0215217 A1 * | 9/2008 | Unno | 701/54 |
| 2009/0171542 A1 | 7/2009 | Sugiura et al. | |
| 2009/0195375 A1 | 8/2009 | Berg et al. | |
| 2010/0069197 A1 | 3/2010 | Yamazaki | |
| 2011/0130933 A1 * | 6/2011 | Muto et al. | 701/58 |

FOREIGN PATENT DOCUMENTS

| | | |
|---|---|---|
| JP | 4356278 | 12/1992 |
| JP | 2008038969 | 2/2008 |
| WO | WO 2004/033938 | 4/2004 |

* cited by examiner

*Primary Examiner* — Thomas Tarcza
*Assistant Examiner* — Adam Alharbi
(74) *Attorney, Agent, or Firm* — Snell & Wilmer LLP (57) ABSTRACT

The present invention is directed to a method and system for adjusting a gear map. The present invention can be an automobile including a continuously variable transmission system, an ignition detecting ignition data, and/or a display unit. The continuously variable transmission system can include a continuously variable transmission, a memory storing a gear map including virtual gears, a gear adjustment mode input unit detecting gear adjustment mode data, and/or a processor. The processor can control the continuously variable transmission to operate at a desired engine speed for a specific automobile speed using the gear map. The processor can adjust the gear map using the gear adjustment mode data, and/or the ignition data. The processor can control the display unit to display information to prompt the user to supply the gear adjustment mode data.

17 Claims, 6 Drawing Sheets

METHOD AND SYSTEM FOR ADJUSTING A GEAR MAP

BACKGROUND

1. Field

The present invention relates to a method and system for adjusting a gear map.

2. Description of the Related Art

A conventional automobile with a conventional transmission generally has a few discrete gears, each of which has its own gear ratio. Thus, the transmission can operate using only a few discrete gear ratios. The gear ratios change the torque multiplication between the prime mover, typically an internal combustion engine, and the wheels. The resultant wheel torque divided by prime mover torque is the gear ratio. A similar multiplication of prime mover speed occurs. The automobile switches between the discrete gear ratios by changing gears. Thus, a change in gears to achieve a desired increased torque multiplication results in a rise in prime mover speed. Note that although prime mover torque output might change, and thus wheel torque will be variable based upon driver demand, the speed ratio between the prime mover and vehicle speed remains the same. As a result, the driver anticipates engine speed increasing at a specific rate with increasing vehicle speed while the automobile stays in the same gear.

Besides multiplying torque for acceleration, fixed gear ratios are also used to reduce engine speed to improve fuel economy. Typically, the number of gear ratios included in a transmission is a compromise between fuel efficiency, performance, driveability, and cost. Thus, a conventional transmission has a fixed number of gears in the gear map, fixed locations of the gears in the gear map, and a fixed gear ratio for each of the specific gears in the gear map.

A conventional continuously variable transmission was developed to address fuel efficiency. Unlike a conventional transmission, the conventional continuously variable transmission has an infinite number of gear ratios available in the gear map. Thus, there are no specific gears that the conventional continuously variable transmission uses to determine the gear ratio. Whereas, the gear ratio that the conventional continuously variable transmission operates at is largely dependent on the required automobile speed and the desired efficiency of the automobile.

The drawback is that the user may not be able to anticipate the engine speed for a specific automobile speed because no specific gears are used. This can be undesirable to some users. Thus, although the conventional continuously variable transmission can be more fuel efficient than the conventional transmission, some users may have difficulty adjusting to the unexpected engine speed used for a specific automobile speed. In addition, the conventional continuously variable transmission may still provide a fixed driving experience, since the user is unable to choose the engine speed for the specific automobile speed. For example, the user may not approve of the specific engine speed utilized by the conventional continuously variable transmission for the specific automobile speed as selected by the manufacturer. Thus, the conventional continuously variable transmission may still be inadequate for the user.

Thus, there is a need for a method and system for adjusting a gear map.

SUMMARY

The present invention is directed to a method and system for adjusting a gear map. In one embodiment, the present invention is an automobile including a continuously variable transmission system, an ignition detecting ignition data, and/or a display unit. The continuously variable transmission system can include a continuously variable transmission, a memory storing a gear map, a gear adjustment mode input unit detecting gear adjustment mode data, and/or a processor. The processor can control the continuously variable transmission to operate at a desired engine speed for a specific automobile speed using the gear map. The gear map can include virtual gears placed within an available virtual gear placement area. Each of the virtual gears can include a gear ratio and can indicate a desired engine speed for a specific automobile speed. The gear map can be a default gear map supplied by a manufacturer of the automobile, or an adjusted gear map which is an adjustment of the default gear map by a user.

The processor can adjust the gear map using the gear adjustment mode data, and/or the ignition data. The processor can control the display unit to display information to prompt the user to supply the gear adjustment mode data. The ignition data indicates the user's desire to activate the automobile. Once the automobile is activated, the gear adjustment mode data indicates the user's desire to adjust the gear map. The gear adjustment mode data can also indicate the desired adjustments to the gear map, such as the desired adjustment to the number of virtual gears, the desired adjustment to the gear ratios of the virtual gears, and/or the desired adjustment to the location of the virtual gears.

By using virtual gears, the user can anticipate the engine speed for a specific automobile speed. In addition, since the gear map, and more specifically, the virtual gears, can be adjusted, the user can customize his experience with the automobile. This can result in a more intuitive and comfortable driving experience for the user over a conventional continuously variable transmission. In addition, since the virtual gears can be adjusted, the fuel efficiency of the automobile can also be improved over a conventional transmission.

In one embodiment, the present invention is a continuously variable transmission system including a memory storing a gear map including a plurality of virtual gears and a processor connected to the memory, the processor configured to adjust the virtual gears in the gear map based on gear adjustment mode data.

In another embodiment, the present invention is an automobile including a continuously variable transmission, a gear adjustment mode input unit detecting gear adjustment mode data, a memory storing a gear map including a plurality of virtual gears, and a processor connected to the continuously variable transmission, the gear adjustment mode input unit, and the memory, the processor configured to adjust the virtual gears in the gear map based on gear adjustment mode data and to control a desired operation of the continuously variable transmission based on the gear map.

In yet another embodiment, the present invention is a method for adjusting a gear map in an automobile including storing, in a memory, a gear map including a plurality of virtual gears, adjusting, using a processor, the virtual gears in the gear map based on gear adjustment mode data, and controlling, using the processor, an operation of a continuously variable transmission based on the gear map.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
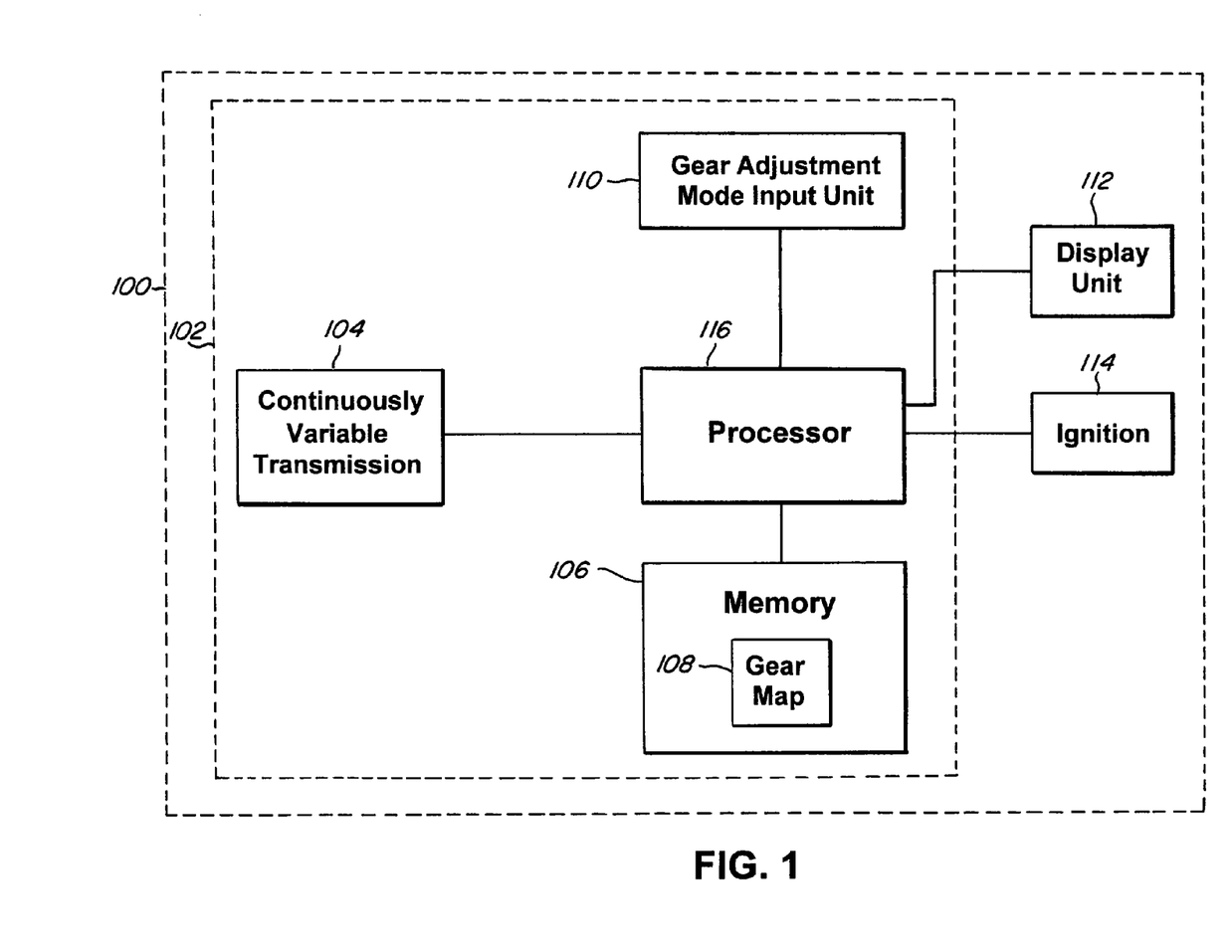
FIG. 1 depicts a box diagram of an automobile including a continuously variable transmission system according to an embodiment of the present invention.

In one embodiment, the present invention includes an automobile 100 as seen in FIG. 1. The automobile 100 can include, for example, a continuously variable transmission system 102, a display unit 112, and/or an ignition 114. The continuously variable transmission system 102 can include, for example, a continuously variable transmission 104, a memory 106, and/or a gear adjustment mode input unit 110.

The continuously variable transmission 104 is connected, for example, to a processor 116. Unlike a conventional transmission, which has a finite number of gears and thus a finite number of gear ratios, the continuously variable transmission 104 can operate at almost any gear ratio. In addition, unlike a conventional continuously variable transmission, which does not have any gears, the continuously variable transmission 104 can operate using any number of virtual gears. The virtual gears can allow the user to anticipate the engine speed for a specific automobile speed. The continuously variable transmission 104 can move or propel the automobile 100 and can include, for example, an engine operating at an engine speed. By varying the engine speed, a movement of the automobile 100 can be controlled. In addition, an operation of the continuously variable transmission 104 can be controlled by the processor 116.

The memory 106 is connected, for example, to the processor 116. The memory 106 can store, for example, a gear map 108. The gear map 108 can be seen, for example, in FIG. 2. The gear map 108 can include a plurality of virtual gears. For example, virtual gears 1, 2, 3, 4, 5, and 6 are shown. Each of the virtual gears corresponds to, for example, an engine speed for a desired automobile speed. For example, the virtual gear 1 and the virtual gear 2 overlap at approximately 10 km/h. When the automobile 100 is traveling at approximately 10 km/h, the virtual gear 1 corresponds to the engine speed of approximately 3,000 rotations per minute ("RPM"). However, the virtual gear 2 corresponds to the engine speed of approximately 2,000 RPM when the automobile 100 is traveling at 10 km/h.

Each of the virtual gears can have a gear ratio. The gear ratio of the virtual gears can indicate, for example, a corresponding increase in engine speed for a corresponding increase in automobile speed. In the gear map shown in FIG. 2, the virtual gear 1 has a higher gear ratio than the virtual gear 2. For example, in virtual gear 1, a change of approximately 8 km/h corresponds to a change of engine speed of approximately 3,700 RPM. However, in virtual gear 2, a change of approximately 14 km/h results in a corresponding change of engine speed of approximately 3,400 RPM. Thus, in virtual gear 1, a change of 1 km/h in the automobile speed results in a greater change in engine speed, than in virtual gear 2.

Figure 2:
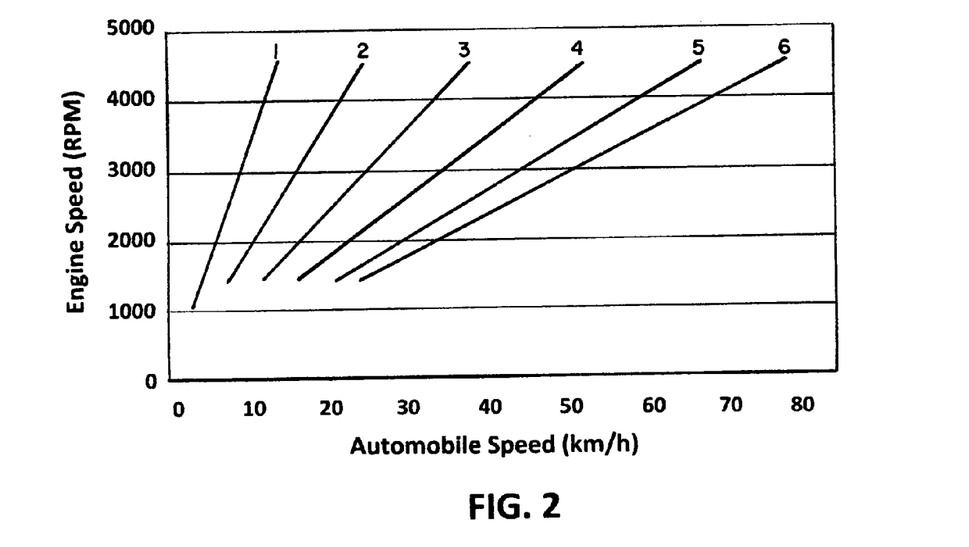
FIG. 2 depicts a gear map with six virtual gears according to an embodiment of the present invention.
Figure 3:
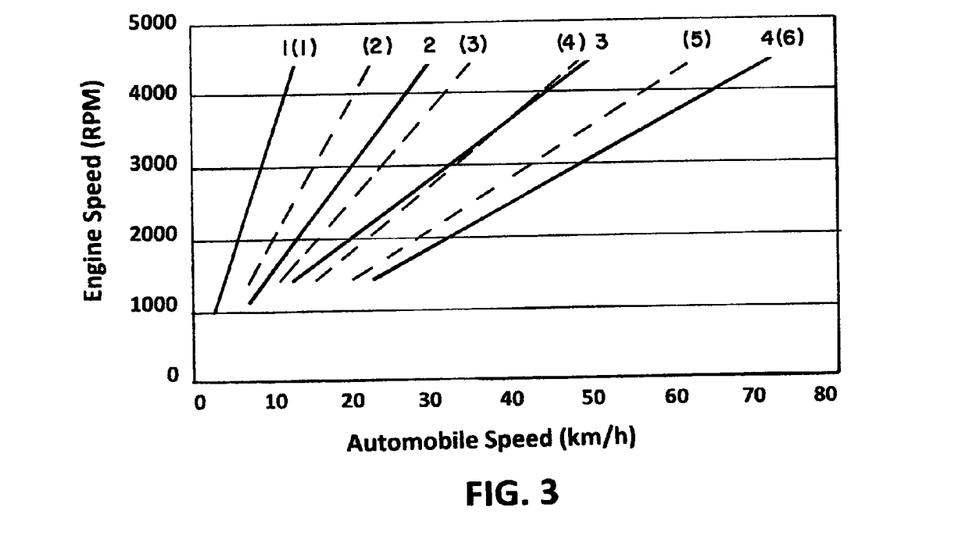
FIG. 3 depicts a gear map with four virtual gears according to an embodiment of the present invention.

Unlike a conventional transmission with a fixed number of gears and gear ratios, the number of virtual gears and the gear ratio of each of the virtual gears in the gear map of the continuously variable transmission 104 can be varied, as shown in FIG. 3. In FIG. 3, the gear map is adjusted to utilize only 4 virtual gears instead of 6 virtual gears. The virtual gears of the gear map shown in FIG. 2 are indicated in parenthesis. The virtual gears 1 and 4 in FIG. 3 are identical to virtual gears (1) and (6) from FIG. 2. However, virtual gears (2), (3), (4), and (5) are replaced by the virtual gears 2 and 3. Virtual gears (2), (3), (4), and (5) are indicated in dotted lines.

Figure 4:
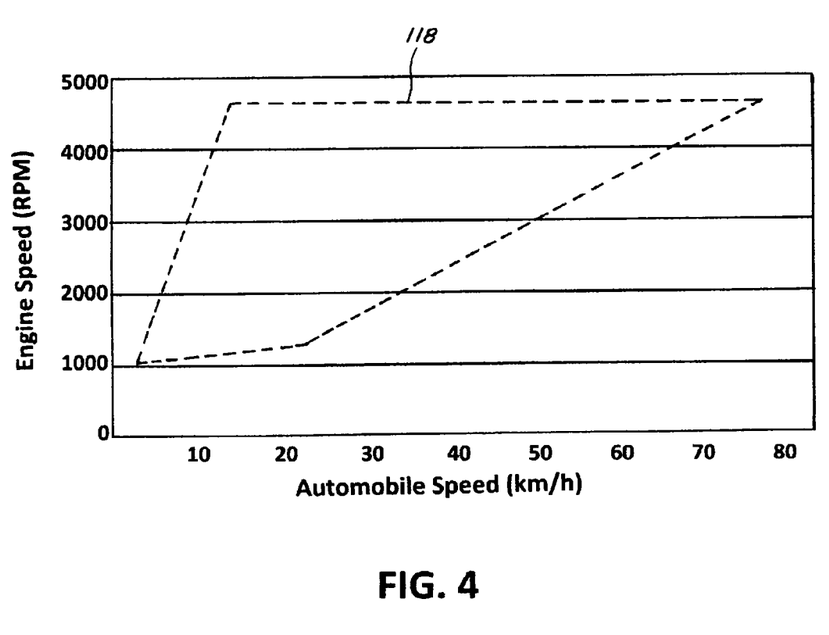
FIG. 4 depicts an available virtual gear placement area in a gear map according to an embodiment of the present invention.

In addition, the virtual gears can generally be located anywhere in the gear map. However, as seen in FIG. 4, the virtual gears can be limited by the manufacturer of the automobile 100 to be within a virtual gear placement area 118 as indicated by the dotted lines. Although the virtual placement area 118 is a quadrilateral in FIG. 4, the virtual placement area 118 can be a curved shape or any type of polygon as determined by the manufacturer of the automobile 100. The size and shape of the virtual placement area 118 can be dependent on the limitations of the continuously variable transmission, the engine, and/or a result of calculations by the manufacturer to maximize efficiency. As long as the virtual gears remain within the virtual gear placement area 118, virtual gears can be adjusted by the user. Thus, as will be described below, the gear ratio and the location of the virtual gears can be adjusted by the user.

The gear adjustment mode input unit 110 can be connected, for example, to the processor 116. The gear adjustment mode input unit 110 can detect gear adjustment mode data. The gear adjustment mode data can indicate, for example, a desire to adjust the gear map 108 and more specifically to adjust the virtual gears in the gear map 108. In one embodiment, the gear adjustment mode input unit 110 can be, for example, a button, a switch, a paddle shifter, a lever, a touch screen, keyboard, or any other type of device sufficient for a user to convey his desire to adjust the gear map 108.

Figure 5:
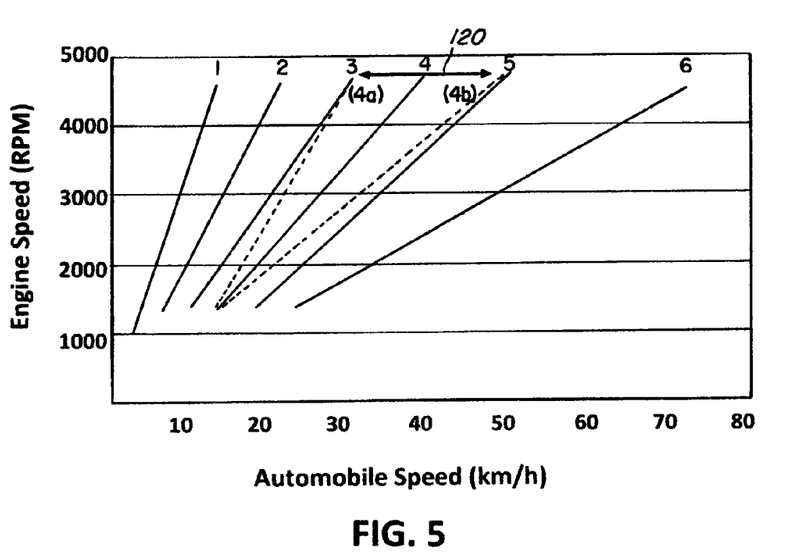
FIG. 5 depicts an adjustment of a gear ratio of a virtual gear in a gear map according to an embodiment of the present invention.

The gear adjustment mode data can also indicate, for example, desired adjustments to the gear map 108, and more specifically, adjustments to the virtual gears in the gear map 108. For example, the gear adjustment mode data can indicate a desired adjustment to the gear ratio of one or more of the virtual gears, and/or a desired adjustment to a location of the gear map of one or more of the virtual gears. For example, as seen in FIG. 5, the gear ratio of the virtual gear 4 can be adjusted such that the virtual gear (4a) or (4b) can be used instead of the virtual gear 4 as indicated by the arrow 120.

Figure 6:
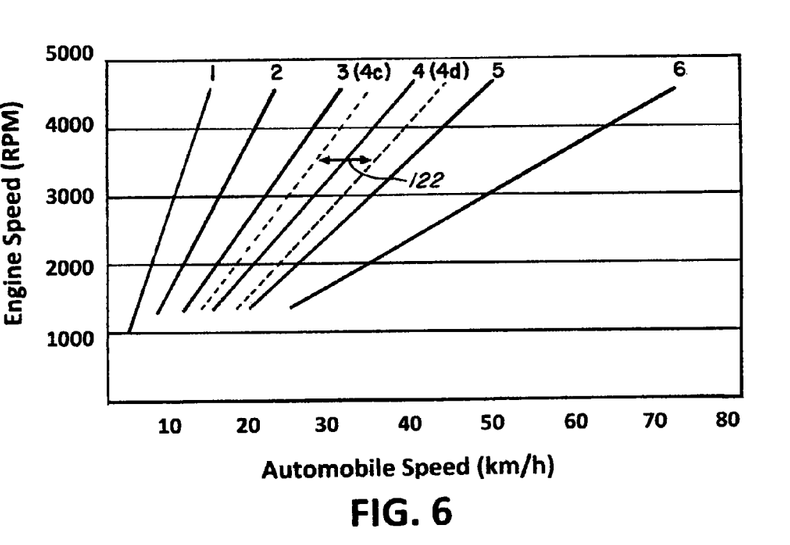
FIG. 6 depicts an adjustment of a location of a virtual gear in a gear map according to an embodiment of the present invention.

In addition, as seen in FIG. 6, the location of the virtual gears can be adjusted. For example, as seen in FIG. 6, the location of the virtual gear 4 can be adjusted such that the virtual gear (4c) and (4d) can be used instead of the virtual gear 4 as indicated by the arrow 122. By adjusting the location of the virtual gears, the automobile speed at which a virtual gear transitions to another virtual gear can be adjusted.

In one embodiment, the gear map 108 can include, for example, a default gear map which can be a gear map that is supplied by the manufacturer of the automobile, and/or an adjusted gear map which is an adjustment of the default gear map based on the gear adjustment mode data. In one embodiment, the default gear map cannot be overridden, but instead any adjustments to the default gear map can be saved as an adjusted gear map separate from the default gear map. The adjusted gear map or the default gear map can be selected, for example, by a user using the gear adjustment mode input unit 110.

The processor 116 is connected, for example, to the continuously variable transmission 104, the memory 106, the gear adjustment mode input unit 110, the ignition 114, and/or the display unit 112. The processor 116 can control, for example, the operations of the continuously variable transmission 104, and/or the display unit 112. For example, the processor 116 can control the desired engine speed of the continuously variable transmission 104 based on the corresponding speed of the automobile 100, and the gear map 108. In addition, the processor 116 can control the information that is displayed by the display unit 112. The processor 116 can also receive the gear adjustment mode data, and/or the ignition data, some or all of which can be used to adjust the gear map 108, and/or determine which gear map (adjusted gear map or default gear map) to use in controlling the continuously variable transmission 104.

The display unit 112 is connected, for example, to the processor 116. The display unit 112 can display the gear map 108 and/or adjustments to the gear map 108. In addition, the display unit 112 can display some or all of the gear adjustment mode data. In addition, the display unit 112 can display questions or prompts to the user so that the processor 116 can receive feedback as to whether the user wishes to adjust the virtual gears and how the user wishes to adjust the virtual gears.

The ignition 114 is connected, for example, to the processor 116. The ignition 114 can indicate when a user wishes to activate the automobile 100. The ignition 114 can include, for example, a key hole, a start engine button, and/or a wireless transceiver. The user can indicate when he wishes to activate the automobile 100, for example, by placing a key in the key hole and turning the key in the key hole, placing a key in the key hole and depressing the start engine button, or placing a key near the wireless transceiver and depressing the start engine button. Such indications by the user to activate the automobile 100 can be captured by the ignition 114 as ignition data and transmitted to the processor 116. In one embodiment, activating the automobile 100 does not need to include starting the engine in the automobile 100.

In operation, a user indicates that he wishes to activate the automobile 100 using the ignition 114. If the user wishes to adjust a gear map, the user can do so by actuating the gear adjustment mode input unit 110, which generates gear adjustment mode data indicating the user's desire to adjust the gear map. In one embodiment, the processor 116 only adjusts the gear map when the gear adjustment mode data indicates that the user wishes to adjust the gear map.

Upon receiving the gear adjustment mode data indicating the user's desire to adjust the gear map, the processor 116 can instruct the display unit 112 to display a message asking whether the user wishes to load a default gear map, or an adjusted gear map. The adjusted gear map can be a gear map that the user has previously adjusted, and which is stored in the memory 106. The user can then select which of the gear maps he wishes to adjust using the gear adjustment mode input unit 110, and generating gear adjustment mode data corresponding to such a selection. Based on the gear adjustment mode data, the processor 116 can select either the default gear map or the adjusted gear map to be adjusted.

Next, the processor 116 can instruct the display unit 112 to ask the user whether he wishes to adjust a number of virtual gears in the selected gear map. The user can provide a response to the question using the gear adjustment mode input unit 110. If the user indicates that he wishes to adjust the number of virtual gears, the user can highlight and/or select the number of virtual gears he wishes to use. For example, various integer numbers can be displayed on the display unit 112, and the user can scroll through the various integer numbers until the desired number of virtual gears is highlighted. The user can then select the highlighted number of virtual gears. In one embodiment, the minimum number of virtual gears is 2 virtual gears. However, other numbers, such as 10 virtual gears may be acceptable. The minimum and maximum number of virtual gears can be set, for example, by the manufacturer of the automobile 100.

The processor 116 can then instruct the display unit 112 to display a message asking whether the user wishes to adjust a gear ratio of the virtual gears. Using the gear adjustment mode input unit 110, the user can indicate his desire to adjust the gear ratio of the virtual gears. If the user wishes to adjust the gear ratio, the processor 116 can instruct the display unit 112 to prompt the user to select which virtual gear to adjust the gear ratio. Once the virtual gear is selected, the user can manipulate the gear adjustment mode input unit 110 to instruct the processor 116 to increase or decrease the gear ratio as shown in FIG. 5. While the processor 116 is manipulating the gear ratio of the selected virtual gear, the selected gear map can be displayed on the display unit 112 and both the selected virtual gear with the gear ratio adjustment and without the gear ratio adjustment can be shown, so that the user can grasp the type and amount of adjustment to the gear ratio of the virtual gear. Thus, the user can easily identify the selected virtual gear without any adjustments to the gear ratio, and the selected virtual gear with the adjustments to the gear ratio.

Next, the processor 116 can instruct the display unit 112 to display a message asking whether the user wishes to adjust a location of the virtual gears in the gear map. Using the gear adjustment mode input unit 110, the user can indicate his desire to adjust a location of the virtual gears in the selected gear map. If the user wishes to adjust a location of the virtual gears in the selected gear map, the processor 116 can instruct the display unit 112 to prompt the user to select which virtual gear to adjust a location. Once the virtual gear is selected, the user can manipulate the gear adjustment mode input unit 110 to instruct the processor 116 to adjust the location of the selected virtual gear, as shown in FIG. 6. While the processor 116 is manipulating the location of the selected virtual gear, the selected virtual gear with the location adjustment and without the location adjustment can be shown, so that the user can grasp the type and amount of adjustment to the location of the virtual gear. Thus, the user can easily identify the selected virtual gear without any adjustments to the location, and the selected virtual gear with the adjustments to the location.

The processor 116 can instruct the display unit 112 to ask whether the user wishes to save the selected gear map that has been adjusted as an adjusted gear map. The user can indicate his desire to do so using the gear adjustment mode input unit 110. Once saved, the processor 116 can immediately begin using the adjusted gear map for controlling the desired operations of the continuously variable transmission 104, including, for example, the corresponding engine speed at a particular automobile speed.

By allowing the user to adjust the characteristics of the virtual gears, including, for example, the number of virtual gears, the gear ratios of the virtual gears, or the location of the virtual gears, the continuously variable transmission system 102 of the present invention allows the user to fully customize his driving experience. Thus, the user can determine when the engine speed should be higher so that he can receive more power and/or torque, or when the engine speed should be lower in order to increase fuel economy. In addition, adjustments to the virtual gears in the gear map can affect, for example, the smoothness or jerkiness of the riding experience for the automobile 100.

Figure 7:
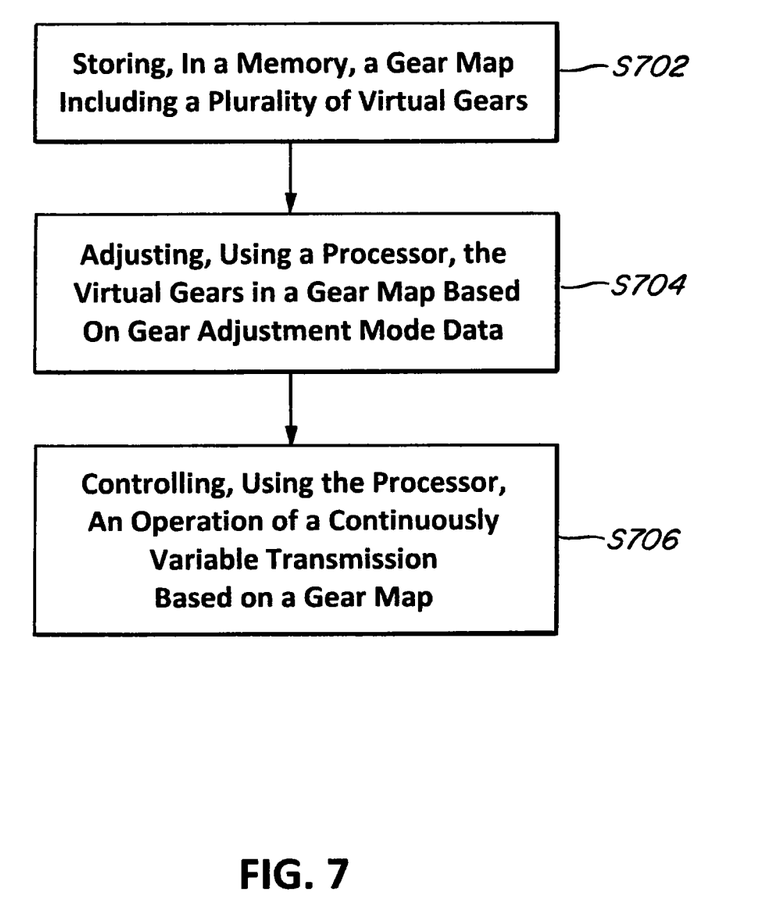
FIG. 7 depicts a process according to an embodiment of the present invention.

In one embodiment, the present invention is a process as shown in FIG. 7. In Step S702, a gear map including a plurality of virtual gears is stored in the memory. For example, the gear map 108 can be stored in the memory 106. In Step S704, the virtual gears in the gear map are adjusted based on the gear adjustment mode data. For example, the processor 116 can adjust the virtual gears in the gear map 108 based on the gear adjustment mode data from the gear adjustment mode input unit 110. In Step S706, the operation of the continuously variable transmission is controlled by the processor 116 based on the gear map. For example, the processor 116 can control the operation of the continuously variable transmission 104 using the gear map 108.

Figure 8:
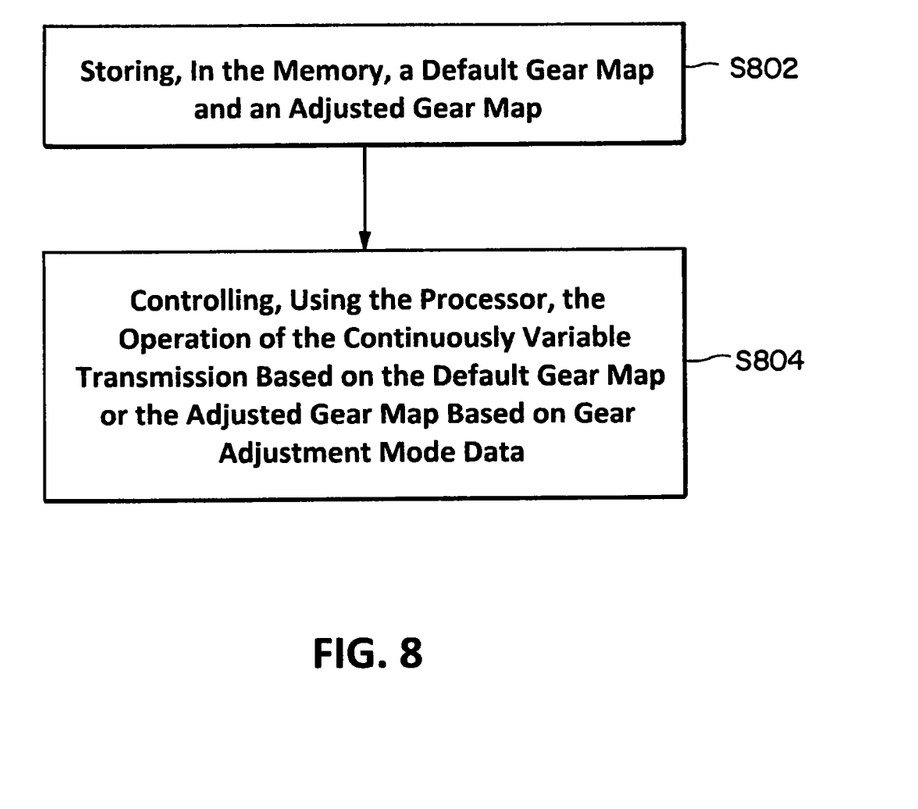
FIG. 8 depicts a process according to an embodiment of the present invention.

In another embodiment, the present invention is a process as shown in FIG. 8. In Step S802, a default gear map and an adjusted gear map is stored in the memory. For example, the default gear map and the adjusted gear map is stored in the memory 108. In Step S802, the processor 116 controls the operation of the continuously variable transmission based on the default gear map or the adjusted gear map based on the gear adjustment mode data. For example, the display unit 112 can display an option for the user to select the default gear map or the adjusted gear map using the gear adjustment mode input unit 110. Based on the user's selection, the processor 116 uses either the default gear map or the adjusted gear map to operate the continuously variable transmission 104.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A continuously variable transmission system comprising:
   an input device for receiving user generated gear adjustment mode data;
   a memory for storing the user generated gear adjustment mode data corresponding to a gear map including a plurality of virtual gears; and
   a processor connected to the memory, the processor configured to adjust the gear map based on the user generated gear adjustment mode data and control a continuously variable transmission based on the adjusted gear map.

2. The system of claim 1 wherein the input device comprises a gear adjustment mode input unit connected to the processor and detecting the user generated gear adjustment mode data.

3. The system of claim 1 wherein the processor is configured to adjust a number of virtual gears in the gear map based on the user generated gear adjustment mode data.

4. The system of claim 1 wherein the processor is configured to adjust a gear ratio of one or more of the virtual gears based on the user generated gear adjustment mode data.

5. The system of claim 1 wherein the processor is configured to adjust a location on the gear map of one or more of the virtual gears based on the user generated gear adjustment mode data.

6. The system of claim 5 wherein the processor is configured to adjust a location on the gear map of one or more of the virtual gears based on an available virtual gear placement area in the gear map.

7. The system of claim 1 wherein the gear map indicates a desired operation of the continuously variable transmission.

8. The system of claim 1 wherein the memory is configured to store a default gear map and the adjusted gear map, and the processor is configured to control a desired operation of the continuously variable transmission using the default gear map or the adjusted gear map based on the user generated gear adjustment mode data.

9. An automobile comprising:
   a continuously variable transmission;
   a gear adjustment mode input unit for detecting user generated gear adjustment mode data indicating a gear map adjustment;
   a memory for storing the user generated gear adjustment mode data corresponding to a gear map including a plurality of virtual gears; and
   a processor connected to the continuously variable transmission, the gear adjustment mode input unit, and the memory, the processor configured to adjust the gear map by adjusting at least one of the plurality of virtual gears in the gear map based on the user generated gear adjustment mode data and to control a desired operation of the continuously variable transmission based on the adjusted gear map.

10. The automobile of claim 9 wherein the processor is configured to adjust a number of virtual gears in the gear map, a gear ratio of one or more of the gears, or a location on the gear map of one or more of the virtual gears, based on the user generated gear adjustment mode data and an available virtual gear placement area in the gear map.

11. The automobile of claim 9 wherein the memory is configured to store a default gear map and the adjusted gear map.

12. The automobile of claim 11 wherein the processor is configured to control the desired operation of the continuously variable transmission using the default gear map or the adjusted gear map based on the user generated gear adjustment mode data.

13. A method for adjusting a gear map in an automobile comprising:
   detecting, using an input device, user generated gear adjustment mode data indicating a gear map adjustment;
   storing, in a memory, the user generated gear adjustment mode data corresponding to a gear map including a plurality of virtual gears;
   adjusting, using a processor, the gear map by adjusting at least one of the plurality of virtual gears based on the user generated gear adjustment mode data; and
   controlling, using the processor, an operation of a continuously variable transmission based on the adjusted gear map.

14. The method of claim 13 further comprising determining an available virtual gear placement area in the gear map.

15. The method of claim 14 wherein the step of adjusting the gear map includes:
   adjusting at least one of the plurality of virtual gears in the adjusted gear map based on the user generated gear adjustment mode data and the available virtual gear placement area in the gear map;
   adjusting a gear ratio of at least one of the plurality of virtual gears based on the user generated gear adjustment mode data and the available virtual gear placement area in the gear map; and
   adjusting a location on the gear map of at least one of the plurality of virtual gears based on the user generated gear adjustment mode data and the available virtual gear placement area in the gear map.

16. The method of claim 13 further comprising storing, in the memory, a default gear map and the adjusted gear map.

17. The method of claim 16 further comprising controlling, using the processor, the operation of the continuously variable transmission using the default gear map or the adjusted gear map based on the user generated gear adjustment mode data.

* * * * *